United States Patent
Nadler et al.

(10) Patent No.: US 8,983,446 B2
(45) Date of Patent: Mar. 17, 2015

(54) SYSTEMS AND METHODS FOR THE DETECTION AND ALLOWANCE OF TRANSMISSION FACILITIES

(75) Inventors: Barry Nadler, Largo, FL (US); Joseph S. Noonan, Scituate, MA (US)

(73) Assignee: BINJ Laboratories, Inc., Scuituate, MA (US)

( * ) Notice: Subject to any disclaimer, the term of this patent is extended or adjusted under 35 U.S.C. 154(b) by 786 days.

(21) Appl. No.: 12/510,036

(22) Filed: Jul. 27, 2009
(Under 37 CFR 1.47)

(65) Prior Publication Data
US 2010/0105416 A1  Apr. 29, 2010

Related U.S. Application Data

(63) Continuation-in-part of application No. 11/457,786, filed on Jul. 14, 2006, now Pat. No. 8,078,190.

(60) Provisional application No. 60/699,281, filed on Jul. 14, 2005, provisional application No. 60/739,877, filed on Nov. 23, 2005.

(51) Int. Cl.
*H04M 3/00* (2006.01)
*H04W 48/04* (2009.01)
*H04W 64/00* (2009.01)

(52) U.S. Cl.
CPC ............ *H04W 48/04* (2013.01); *H04W 64/006* (2013.01)
USPC ...................... 455/419; 455/456.1; 455/456.2; 455/456.6; 455/457; 455/418; 455/420

(58) Field of Classification Search
USPC ........ 455/456.1, 456.2, 456.6, 457, 418, 419, 455/420
See application file for complete search history.

(56) References Cited

U.S. PATENT DOCUMENTS

| | | | |
|---|---|---|---|
| 5,440,758 A * | 8/1995 | Grube et al. | 455/9 |
| 5,966,655 A | 10/1999 | Hardouin | |
| 6,222,458 B1 | 4/2001 | Harris | |
| 6,343,212 B1 | 1/2002 | Weber | |
| 6,580,372 B1 | 6/2003 | Harris | |
| 6,765,492 B2 | 7/2004 | Harris | |
| 6,907,254 B1 | 6/2005 | Westfield | |
| 7,202,798 B2 | 4/2007 | Harris | |
| 2002/0098850 A1 * | 7/2002 | Akhteruzzaman et al. | 455/456 |
| 2003/0206112 A1 | 11/2003 | Harris | |
| 2004/0009778 A1 * | 1/2004 | Makuta | 455/456.1 |
| 2004/0043774 A1 * | 3/2004 | Lee | 455/456.1 |
| 2004/0198346 A1 * | 10/2004 | Swensen et al. | 455/431 |
| 2004/0246139 A1 | 12/2004 | Harris | |
| 2006/0099968 A1 | 5/2006 | Harris | |
| 2006/0105758 A1 * | 5/2006 | Maislos | 455/420 |

* cited by examiner

*Primary Examiner* — Justin Lee
(74) *Attorney, Agent, or Firm* — Law Office of Carl Giordano, PC

(57) ABSTRACT

A method of detecting a transmitting device within a facility is disclosed. The method involves detecting the transmitting device of a wireless transmission detection facility; communicating signal information relating to the detected transmitting device to a central unit where the detected transmitting device is identified; determining whether the detected transmitting device is allowed within the facility and providing instruction to a transmitting device to interfere with the detected transmitting device when the detected transmitting device is not allowed in the facility and providing instructions and methodologies when the detected transmitting device is allowed in the facility.

18 Claims, 15 Drawing Sheets

SYSTEMS AND METHODS FOR THE DETECTION AND ALLOWANCE OF TRANSMISSION FACILITIES

CLAIM OF PRIORITY

This application claims the benefit of the earlier filing date, pursuant to 35 USC §120, as a continuation-in-part, to that patent application entitled "Systems and Methods of Detection Transmission Facilities," filed in the United States Patent and Trademark Office on Jul. 14, 2006 and afforded Ser. No. 11/457,786 (now U.S. Pat. No. 8,078,190), which claims, pursuant to 35 USC 119, the benefit of the earlier filing dates of, and incorporated by reference the subject matter recited in, U.S. Provisional App. No. 60/699,281 filed on Jul. 14, 2005 and U.S. Provisional App. No. 60/739,877, filed on Nov. 23, 2005. The entire content of these applications being incorporated by reference, herein.

RELATED APPLICATIONS

The subject matter disclosed in this application is related to the subject matter disclosed in patent application, entitled "Tracking and Determining a Location of a Wireless Transmission," filed in the United States Patent and Trademark Office on Jun. 11, 2008 and afforded Ser. No. 12/157,530, (now U.S. Pat. No. 8,238,936), which claimed the benefit of the earlier filing date, pursuant to 35 USC 119, of U.S. Provisional App. No. 60/933,997, and patent application entitled "Wrist Band Transmitter," filed in the United States Patent and Trademark Office on Sep. 2, 2008 and afforded Ser. No. 12/231,437, which claimed the benefit of the earlier filing data, pursuant to 35 USC 119, of U.S. Provisional App. No. 60/966,770, the entire contents of all of which are incorporated by reference, herein.

BACKGROUND

1. Field

This invention relates to location of transmission facilities and more particularly to the location of transmission facilities, such as cellular phones, in correctional institutions and controlling their use.

2. Background

There are many facilities, such as government buildings, and in particular correctional facilities, such as prisons, that do not permit cellular phone usage on the premises or even possession of cell phones in the premises. Finding and preventing usage of cell phones and other transmission facilities is difficult, and a need exists for improved methods of locating such devices, as well as a need for detecting such devices upon ingress to a facility.

SUMMARY

Provided herein are methods and systems for locating transmission facilities such as cell phones, mobile phones, satellite phones, radios, transmitters, PDAs, beepers, pagers, walkie-talkies, email devices, instant messenger devices, voice over IP devices, and other types of wireless communication or transmission facilities, and when necessary controlling such transmission facilities.

Embodiments relate to locating and managing the use and presence of wireless communication facilities. Embodiments relate to detecting such devices when they transmit a signal. Other embodiments relate to detecting non-active transmission facilities.

In certain embodiments the methods and systems disclosed herein include methods and systems for detecting a transmitting device within an obstruction rich environment. The methods and systems may include detecting the transmitting device with a wireless transmission detection facility; communicating signal information relating to the detected transmitting device from the wireless transmission detection facility to a central unit; determining the location of the transmitting device; displaying information of the detection and location of the transmitting device through a user interface; and providing an action facility for causing actions related to the detected transmitting device. In embodiments, the wireless transmission detection facility is an antenna. In embodiments, the antenna is a dual dipole embedded antenna. In embodiments, the dual dipole embedded antenna is tuned to receive cell phone transmissions. In embodiments the dual dipole embedded antenna is tuned to receive a frequency band of approximately 700 to 950 MHz. In embodiments the dual dipole embedded antenna is tuned to receive a frequency band of approximately 1.7 to 2.0 GHz. In embodiments the dual dipole antenna is tuned to receive signals in frequency bands of approximately 700 to 950 MHz and 1.7 to 2.0 GHz. In embodiments the obstruction rich environment is a correctional facility. In embodiments the obstruction rich environment is a mall. In embodiments communicating the information relating to the detected transmitting device from the wireless transmission detection facility to a central unit involves wireless communications. In embodiments the wireless communications are 802.11 communications. In embodiments determining the location of the transmitting device is accomplished through transmission triangulation. In embodiments location of the transmitting device is accomplished through a known location of a single antenna.

BRIEF DESCRIPTION OF FIGURES

The systems and methods described herein may be understood by reference to the following figures.

DETAILED DESCRIPTION OF THE INVENTION

Figure 1:
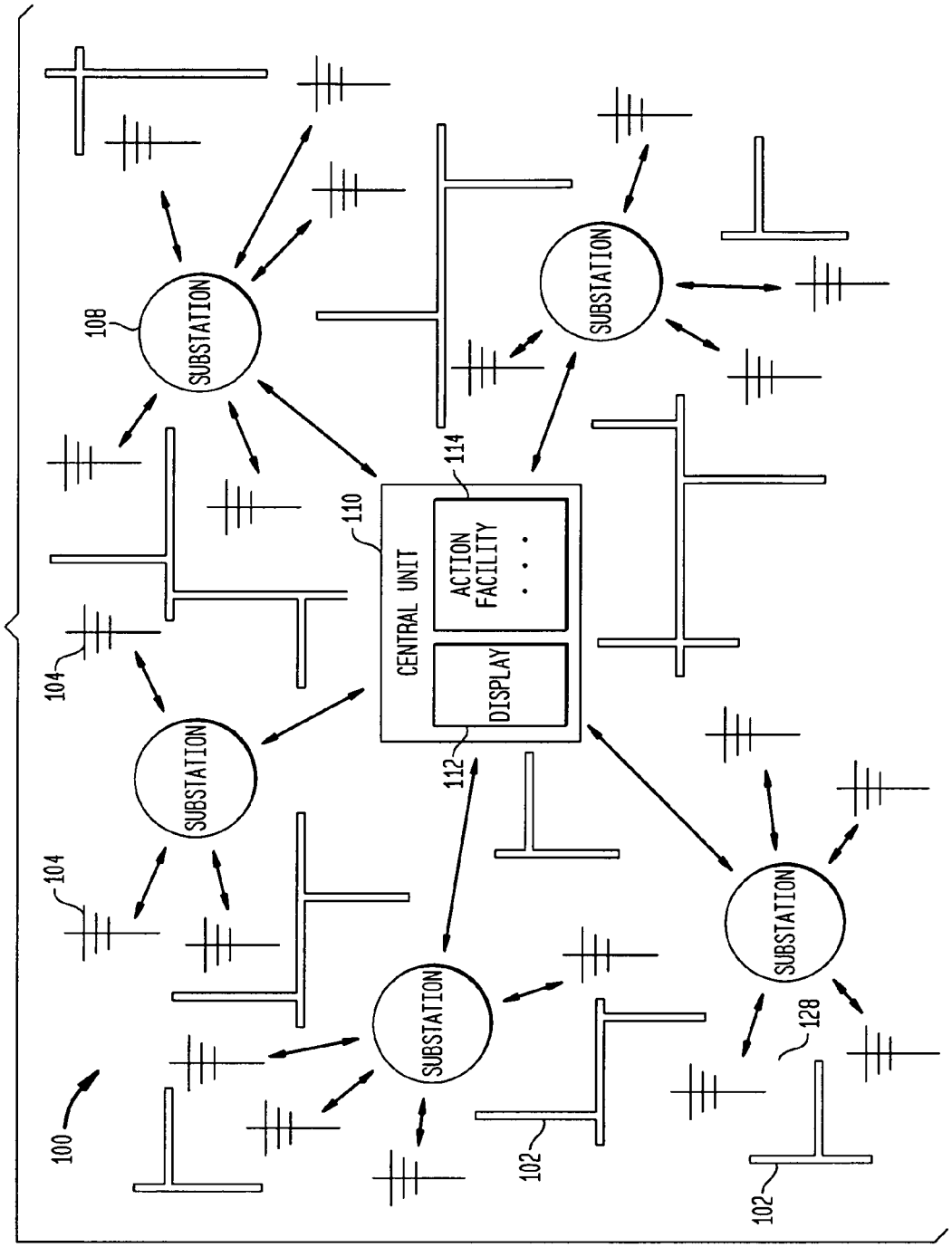
FIG. 1 shows a transmission detection, identification, and reporting system.
Figure 2:
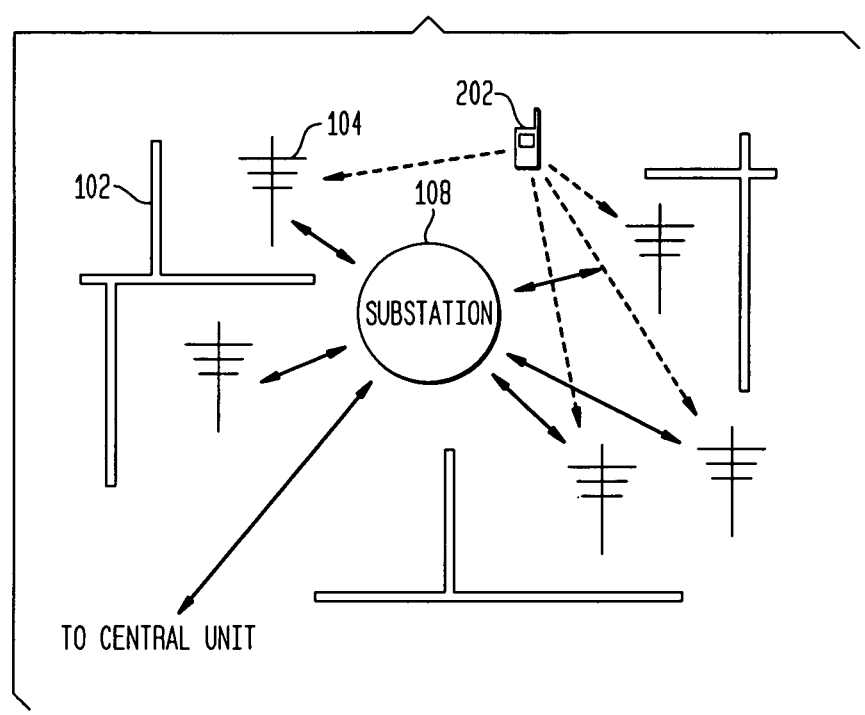
FIG. 2 illustrates a system for detecting a transmission facility

Detection of a transmission facility, such as a mobile phone or hand-held radio transmitter, or other transmission facility as described herein, within an obstruction rich environment, such as a facility with many physical barriers to electronic transmission, is difficult to achieve. Referring to FIG. 1, the transmission detection, identification, and reporting system 100 described herein provides a method of detecting a transmission facility 202, such as depicted in FIG. 2, within an environment rich in obstructions 102. One embodiment of the transmission detection, identification, and reporting system 100 may involve the detection of a mobile phone within a heavily walled and metal-barred government facility such as a correctional facility. In this embodiment, the system may utilize an array of antennas 104 selectively placed within the facility, collection substations 108 for localized collection of detected signals, a central unit 110 for the processing of incoming signals from the facility, a display 112 for showing the location of the detected transmission facility 202, and an action facility 114 for implementing standard procedures in the event of a detection. In this embodiment, the communications between the antennas 104 and the substations 108, and between the substations 108 and the central unit 110, may be wireless to make installation and maintenance of the system within the facility, cost and time effective. Selective placement of the antennas 104, combined with algorithms and methods for determining location of the transmission facility 202, may allow a substantially improved means for locating transmission facilities 202, such as mobile phones, in an otherwise heavily shielded environment.

Figure 3:
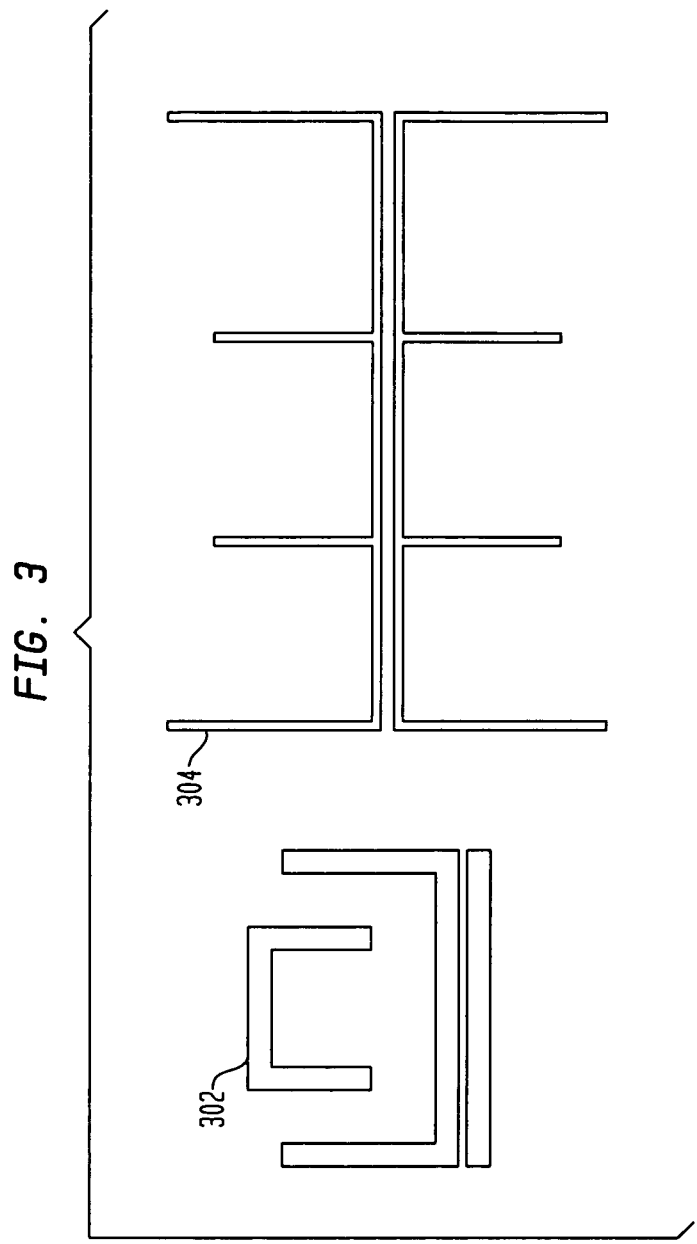
FIG. 3 illustrates antenna configurations.

In embodiments the antenna 104 may be a multi-dipole embedded antenna. Two examples of dual dipole embedded antennas are provided in FIG. 3 as a first dual-dipole embedded antenna 302 and a second dual dipole embedded antenna 304. In embodiments the antenna may be adapted to receive one, two, three, four, or more bandwidths. In embodiments the antenna 104 may be a dipole antenna 104, a Yagi-Uda antenna 104, a loop antenna 104, a quad antenna 104, a micro-strip antenna 104, a quad antenna 104, a helical antenna 104, a phase array antenna 104, a patch antenna or the like.

In embodiments, the transmission facility 202 may be a mobile phone, such as a flip phone, a slide phone, a cellular phone, a handset, a satellite phone, a 3G phone, a wireless phone, a cordless phone or the like. In embodiments, the transmission facility 202 may be a radio, such as a walkie-talkie, a mobile radio, a short-wave radio, or the like. In embodiments, the transmission facility 202 may be a wireless communication device like a laptop computer, a wireless modem, 802 transceivers technology and the like.

In embodiments, the transmission band from the transmission may be within the radio or other electromagnetic frequency spectrum, such as extremely low frequency (ELF), super low frequency (SLF), ultra low frequency (ULF), very low frequency (VLF), low frequency (LF), medium frequency (MF), high frequency (HF), very high frequency (VHF), ultra high frequency (UHF), super high frequency (SHF), extremely high frequency (EHF), microwave, a frequency suitable for 802.11x wireless communications, ultra wide band (UWB), Bluetooth, or the like.

In embodiments, the obstruction 102 rich environment may be a building, such as a corrections facility, a school, a government facility, a store, a mall, a residence, a hotel, a motel, or the like. In embodiments, the obstruction 102 rich environment may be a large confined space, such as a courtyard, a food court, a recess area, a hallway, greenhouse, recreation room, gymnasium, auditorium, kitchen, cafeteria, craft area, work area, library, prison yard, or the like. In embodiments, the obstruction 102 may be a transmission, device transmission obstruction 102, such as cinderblock, cement, rebar, wire cage, metal, metal coated surface, or the like. In embodiments, the obstruction 102 may be other construction materials, such as wood, glass, rug, flooring materials, roofing materials, and the like.

In embodiments, the transmitting signal information from the antenna 104 module to the central unit 110 may be through a communications connection, such as an IEEE 802.15.4 wireless network, IEEE 802.11 Wi-Fi, Bluetooth, Ethernet, or the and the like. In embodiments, the communications connection may utilize CAT-5, RJ-45, RS-232 connections, and the like. In embodiments the communications connection may utilize an optical connection, such as a wireless infrared link, an optical fiber, and the like.

In embodiments, the transmitting signal information from the antenna 104 module to the central unit 110 may contain data, such as CDMA, CDPD, GSM, TDMA, and the like, and may be used to discriminate which service signal is being used, such as Verizon, Cingular, T-Mobile, Sprint, and the like. The detection of the cell phones may be resolved down to cell phone manufacturer and cell phone provider.

In embodiments, the transmitting signal information to the central unit 110 may be made through an intermediate connection, such as a substation 108, router, switch, hub, bridge, multiplexer, modem, network card, network interface, processing unit, preprocessor, computer, repeater, antenna 104, and the like.

In embodiments, the central unit 110 may have in part a computer, a computer system, a network of computers, a state machine, a sequencer, a microprocessor, a digital signal processor, an audio processor, a preprocessor, a microprocessor, and the like.

In embodiments, the central unit 110 may process information, such as location information, such as the location of people, inmates, corrections personnel, visitors, all personnel within the facility, equipment, resources, weapons, products, incoming goods, outgoing goods, and the like. In embodiments, the information may be type of signal, such as mobile phone standard protocols such as CDMA, CDPA, GSM, TDMA, and the like. In embodiments, the information may be an event notification, such as personnel under duress, an emergency medical condition, a call for assistance, a fire, a call for police, a theft, and the like. In embodiments, the processed information may allow for the tracking of the person or object in possession of the transmission facility 202, such as a mobile phone, a radio, a weapon, a product, a resource, and the like. In embodiments, the processed information may allow for the discrimination and/or association between people or objects, such as determining the ownership of the transmission facility 202, the assignment of the source of transmission, current location of a transmission facility 202 compared to its predicted location, and the like. In embodiments, the processed information may also have time codes and unique identifiers assigned.

In embodiments, the central unit 110 may have a display 112, such as a cathode ray tube (CRT), liquid crystal display 112 (LCD), electronic paper, 3D display 112, head-mounted display 112, projector, segmented display 112, computer display 112, graphic output display 112, and the like. In embodiments, the central unit 110 may have an action facility 114, comprising a user interface for causing actions relating to the detected transmission facility 202, such as closing a door, sealing a room, deploying and action signal, initiating an alarm, and the like.

In embodiments the functions of a central unit 110 as described herein may be replaced by an alternate configuration, such as a configuration of multiple computers, such as a group of servers, processors, or the like, operating in parallel. In embodiments the methods and systems described herein may involve locating computing capabilities in alternative network configurations, such as in a mesh network or a peer-to-peer network.

In embodiments, the location of a transmission facility 202 may be determined by various radiolocation or signal measurement techniques, including measuring phase, amplitude, time, or a combination of these; or by identifying and locating an area associated with an antenna 104 with the highest signal strength. In embodiments, the location of a transmission facility 202 may be determined when the transmission facility 202 is powered off though detection of a null in the band pass of a transmitted frequency sweep due to the presence of a mobile phone antenna.

In embodiments, a method of detecting a transmission facility 202 (e.g. cell phone) when the transmission facility 202 is not powered may require a transmitting device and a receiving device that can recognize the signature of an antenna 104 associated with the transmission facility 202. By transmitting a known frequency and receiving the disturbance pattern produced by having a particular antenna 104 design in the transmission path, the pattern or 'signature' of that antenna 104 can be characterized. In embodiments, this characterization may be evaluated with a microprocessor 1402 (see FIG. 14) with results output to a display 112. A database of these signatures can be placed into the device, and as the transmitter sweeps across the various cell frequencies, a pattern received can be matched against the database patterns to determine the presence of transmission facilities 202. In embodiments, any class of antenna (e.g. WI-FI, Blackberry, Walkie-Talkie, etc.) can be classified and identified.

In embodiments, the range of a hand held device that can detect an inactive transmission facility is approximately 10 feet. In embodiments, greater distances could be attained for stationary units by increasing the power.

Radiolocation, also referred to as radio-determination, as used herein encompasses any process of finding the location of a transmitter by means of the propagation properties of waves. The angle, at which a signal is received, as well as the time it takes to propagate, may both contribute to the determination of the location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (ix) location based on proximity to known locations (including locations of other radio-transmitters), (x) map-based location, or any combination of any of the foregoing, as well as other location facilities known to those of skill in the art.

Obstructions 102 to radio wave propagation may greatly reduce the effectiveness of many of the conventional radiolocation methods due to obstruction of the line-of-sight between the transmission facilities 202 and the receiving antennas 104. However, by employing a large array of antennas 104, positioned so as to maintain line-of-sight between possible transmission facility 202 locations and the receiving antennas 104, several of these methods may be effectively used in the location of the transmission facility 202. These methods include time difference of arrival, time of arrival, and angle of arrival, amplitude comparison, and the like. The time difference of arrival method determines the difference in the time, or the difference in phase, of the same radio-transmitting signal arriving at different receiving antennas 104. Together with the known propagation speed of the radio wave, allows the determination of the location of the transmission facility 202. The time of arrival method determines the absolute time of reception of the signal at different receiving antennas 104, and again, along with the known propagation speed of the radio wave, allows the determination of the location of the transmission facility 202. The angle of arrival method utilizes direction of transmission to different antennas 104 to determine the location of the transmission facility. Amplitude comparison method compares the strength of the signal detected at each antenna to determine the location of a transmission facility 202. For example, two antennas 104 located in the same room would detect different signal amplitudes for the same transmission facility 202 output, thereby providing a means of determining which antenna 104 the transmission facility 202 is closer to. Increasing the number of antennas 104 therefore increases the resolution with which the location of the transmission facility 202 may be determined. All of these methods, and combinations of these methods, may employ mathematical processes such as triangulation, trilateration, multilateration, or like, in determining the location of the transmission facility.

Triangulation is the process of finding coordinates and distance to a point by calculating the length of one side of a triangle, given measurements of angles and/or sides of the triangle formed by that point, such as the target transmission facility 202, and two other known reference points, such as the receiving antennas 104. The calculation of the location of the transmission facility 202 may then be performed utilizing the law of sines from trigonometry. Tri-lateration is a method similar to triangulation, but unlike triangulation, which uses angle measurements, together with at least one known distance, to calculate the subject's location, tri-lateration uses the known locations of two or more reference points and the measured distance to the subject, such as the transmission facility 202, and each reference point, such as the receiving antennas 104. Multi-lateration, or hyperbolic positioning, is similar to tri-lateration, but multi-lateration uses measurements of time difference of arrival, rather than time of arrival, to estimate location using the intersection of hyperboloids.

While several radiolocation and triangulation techniques have been described in connection with locating the transmitting device, it should be understood that one skilled in the art would appreciate that there are other location methodologies and such location methodologies are encompassed by the present invention. For example, in embodiments, the location of a single antenna may be known and the single antenna may detect a transmitting device. The location of the transmitting device may be estimated through its known proximity to the single antenna location. This may provide adequate location resolution for certain applications of the technology. Similarly, two or more antennas may be used and each of the antenna locations may be known. When each of the antennas receives a transmission, the corresponding signal strengths may be compared. The one with the highest signal strength may be determined as the one closest to the transmitting device so the corresponding antenna location may provide enough location resolution for certain applications.

In an embodiment of the transmission detection, identification, and reporting system 100, a corrections facility, with its substantial and inherent obstruction 102 rich environment, presents an ideal example of how the transmission detection, identification, and reporting system 100 may significantly increase the detection of transmission facilities 202 such as mobile phones, a significant challenge to authorities of the correction facilities. In this embodiment, the system may be placed throughout the corrections facility for the purpose of alerting the corrections staff that cell phone activity is taking place, the location of the activity and the type, i.e., Nextel, T-Mobile, Verizon, and the like. The following technology may also allow for a standalone detection unit 408 or set of detection units 408 to detect cell phones in schools, buildings and other environments in which the facility's or area's provider does not wish the use of cell phones and is interested in the detection of cell phone use.

In an embodiment, the system may include an integrated antenna 104 and RF detector (together referred to as a detector unit 408), a substation 108, whose purpose may be to communicate with each detector unit 408 within its sector, and report activity to the central unit 110 which reports confirmed activity, type of cell phone, and location to the display 112 of the central unit 110. These detection units 408 may be used individually or in conjunction with each other and may triangulate detection within a specific area. The outside yard areas may be monitored by detection units 408, which may cover large areas, such as 25×25 foot sectors or 5×5 foot sectors, to localize the detection of a cell phone and track its position from one sector to any adjoining sector. That is, as the person moves with a phone, the changing position of that phone may be reported. If the phone moves inside the facility, tracking may continue as interior detection units 408 detect the phone.

In an embodiment, within these basic groups of detection units 408 may be various detection unit 408 types. Some detection unit 408s may be designed to be hard wired via RJ-45 connectors and CAT 5e cable, other detection units 408 may use 802.11b (WI-FI) wireless communications between detection units 408, and there may also be an Infra Red (IR) set of detection units 408 which utilize optical communications techniques. Each communications type may have a specific purpose within the corrections facility or other type of building and/or areas. Hard-wired units may be used when it is not possible to use either an optical unit or a WI-FI unit. Used when there are walls embedded with metal or where the distance and the obstructions 102 may preclude a wireless technique. WI-FI detection units 408 can be used when it is effective to communicate in an area where there are obstructions 102 such as cement walls or cement with embedded rebar walls, facades, and the like. Optical detection units 408 may be used in areas where clear, line-of-sight communications may be possible. Optical detection units 408 may operate over relatively long distances, such as 3,000 feet, while WI-FI detection units 408 may be limited to shorter distances, such as 250 feet.

In an embodiment, there may also be a hand-held detection units 408 to be used once a cell phone has been detected, and the corrections officer(s) or monitor are attempting to pinpoint the location. The detection unit 408 may be similar to the integrated antenna/detector unit of the main system. The detector unit 408 may output an audible alarm whose pitch changes as the signal becomes stronger or weaker.

In an embodiment, a second type of hand-held detector unit 408 may be used to detect a cell phone when it is either off or in a standby condition, also referred to as null detecting. Null detection may be used at an ingress or egress of a building or area as a way of detecting a communication device or device with an antenna. This technique may be used in areas where it is unpractical, unwanted or unwarranted to have x-ray machines or more intrusive detection systems. A null detection system may also be deployed in a handheld device so an inspector can move through an area attempting to detect a communication device.

In an embodiment of the invention, the null detection system may detect the presence of a transmission facility even when the transmission facility is not transmitting a signal. In embodiments, a hand held or mounted null detection device may be used in a correctional institution or other government facility. In embodiments, null detection may utilize a transmission-detection source, independent of the transmission source being detected, which is capable of sweeping across the frequency spectrum of interest and receiving its returning signal. The transmission source sweeps the spectrum of interest, searching for distortions in the returned field. Distortions in the spectrum may be due to the presence of an antenna of a transmission facility 202. Matching the distortion, also referred to as a null in the band pass, to characteristics of known antennas used with mobile phones may allow the detection and/or identification of the transmission facility 202. The unit may output an audible "beep" if it detects a null, allowing the officers to focus in on the location of the cell phone. The range of the hand-held detection units 408 may be, for example, 15 to 20 feet. This will allow cell phones that are in the immediate vicinity to be quickly detected. The null detection may be applicable for egress detection.

In an embodiment of the invention, a survey may be performed to determine optimal placement and the type and number of detection units 408 required. This will insure the minimum number of required detection units 408 to perform optimal detection. The team may provide a report detailing the layout determined to be optimized for the facility and may review this report with the facilities staff so that any required modifications to the plan may be incorporated before installation is begun.

In an embodiment, the initial coverage of a facility may be in the cell blocks 402 and/or pod areas. The same may be true for linear facilities. The survey may cover the entire facility, including open areas, such as courtyards, where required. But the most likely place for the initial install may be in the prison cellblocks 402, since that is where the highest probability of detection may take place.

Figure 4:
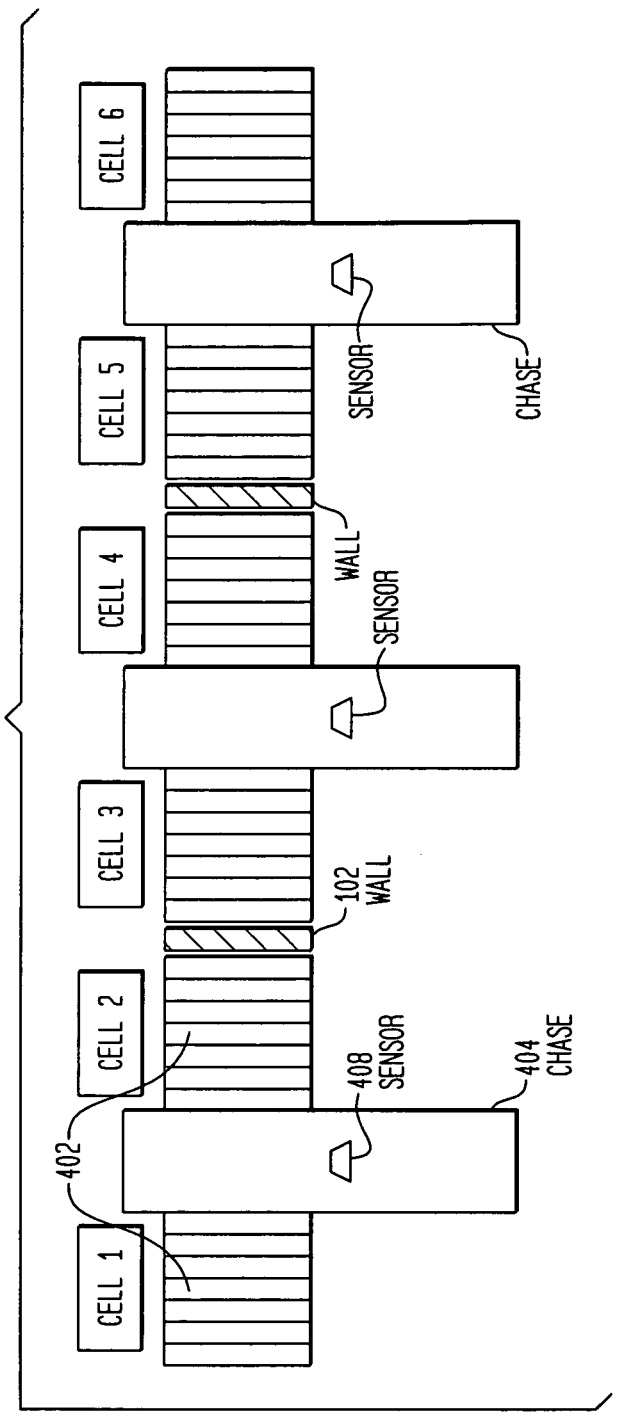
FIG. 4 illustrates a system for detecting a transmission facility in a cell environment.
Figure 5:
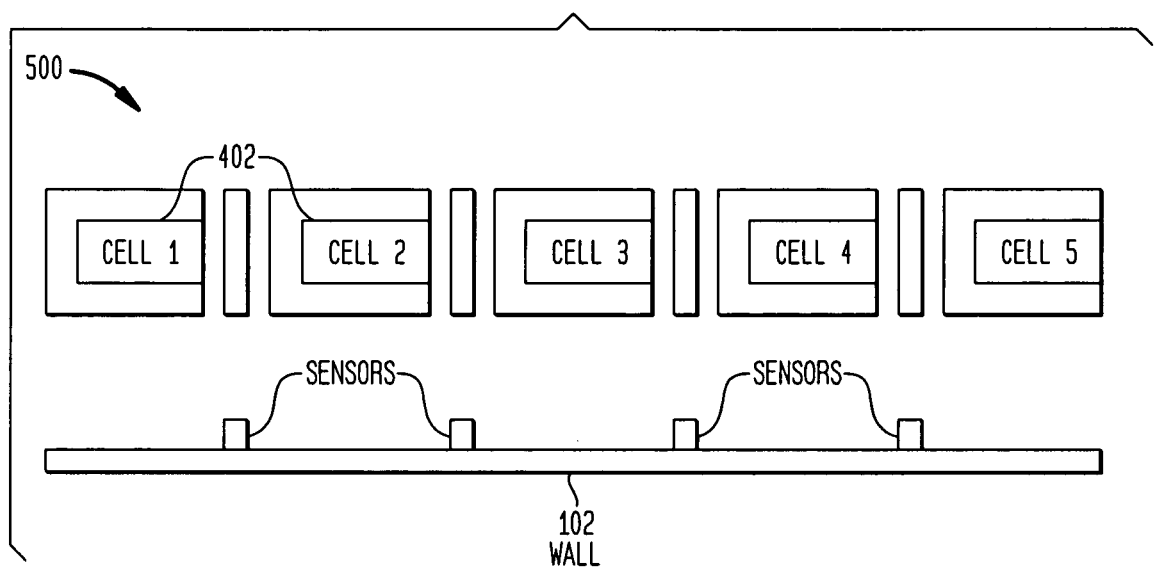
FIG. 5 shows a system for detecting a transmission facility in a cell environment.

In an embodiment of the invention, the cell block units may be mounted inside each chase 404 (a column positioned between cells in a cell block that includes various utility facilities, such as for plumbing and electricity), as shown in FIG. 4, and may communicate to a substation 108 located at one end of the block. This detection unit 408 may communicate its information to the central unit 110 so that tracking, confirmation, and display may be accomplished. For linear facilities 500, detector units 408 may be mounted along the walls 102, as shown in FIG. 5, opposite the cells 402 and perform their function similar to the detection units 408 mounted within a chase 404.

Figure 6:
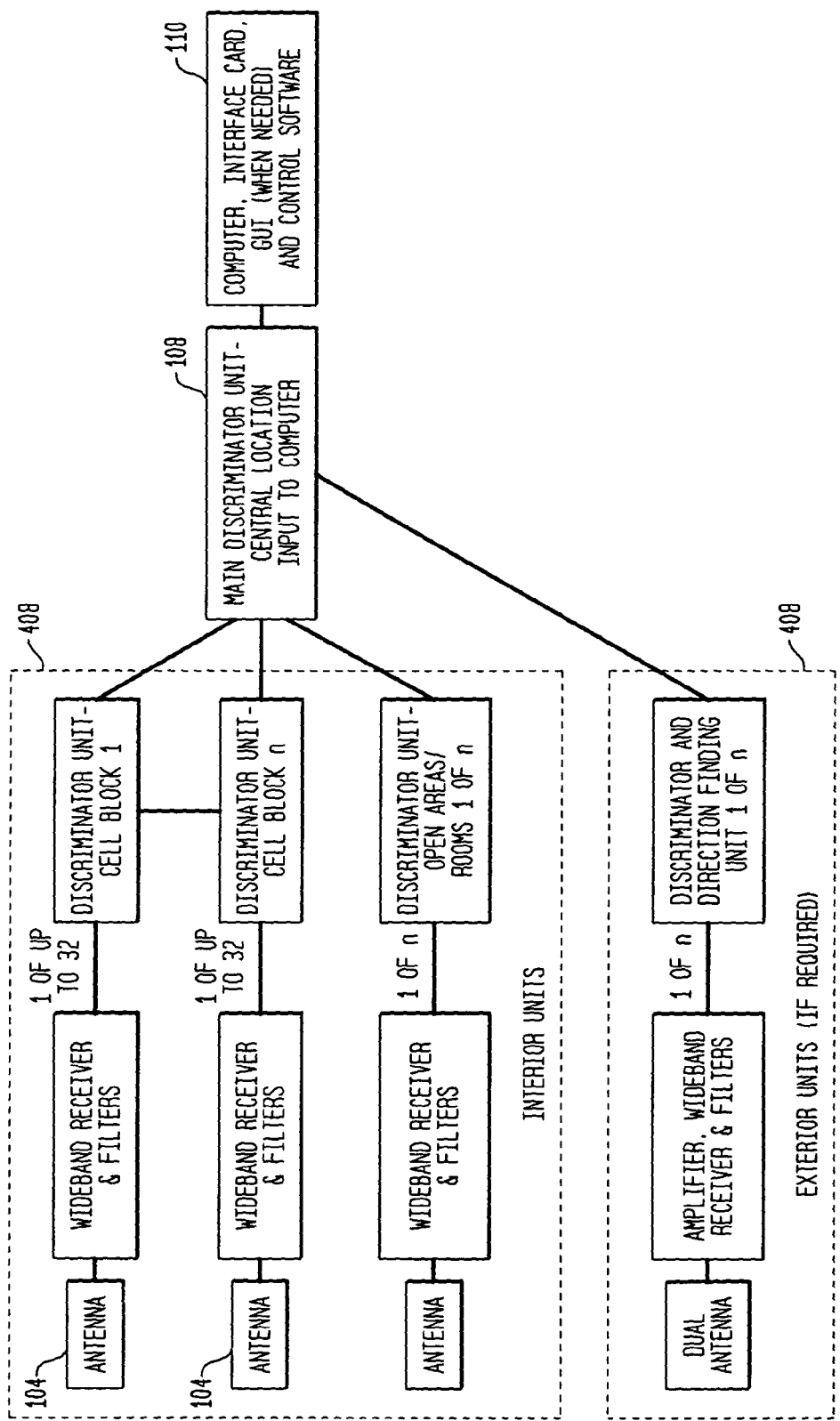
FIG. 6 illustrates a block diagram relating to actions taken when detecting transmission facilities.

In an embodiment of the invention, detector units 408 may be installed in open areas such as gymnasiums, kitchens, cafeterias, craft and work areas and other open areas where a cell phone may be used. The difference in these locations from the cell blocks 402 may include the method of detection and tracking. Since most facilities may only require the identification of a cell phones presence within a room, and there could be many inmates within that room, the process may be to lock-down the room, or rooms, in that area and use a hand held device and a physical search to pinpoint the phone location. A generalized block diagram is shown in FIG. 6. For those facilities that require resolving the location within a large interior room or area, the use of triangulation to resolve to a 10×10 foot area may be used.

Figure 7:
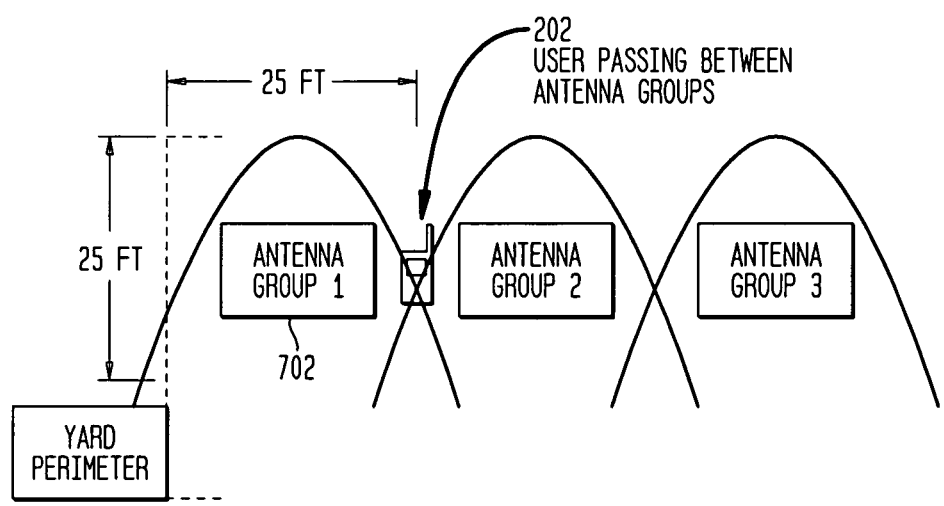
FIG. 7 shows a transmission facility detection system wherein an antenna array is used to calculate location.

In an embodiment of the invention, facilities with the requirement to detect cell phones 202 in outside yard areas, the use of triangulation to a 25×25 foot space or smaller foot space may be constructed. As a phone 202 is moved from area coverage 702 (antenna group 1) to area coverage 702 (antenna group 2), the system may track its movement. Each square foot sector may overlap an adjoining sector. In this way, as shown in FIG. 7, tracking may be continuous, without any gaps.

Figure 8:
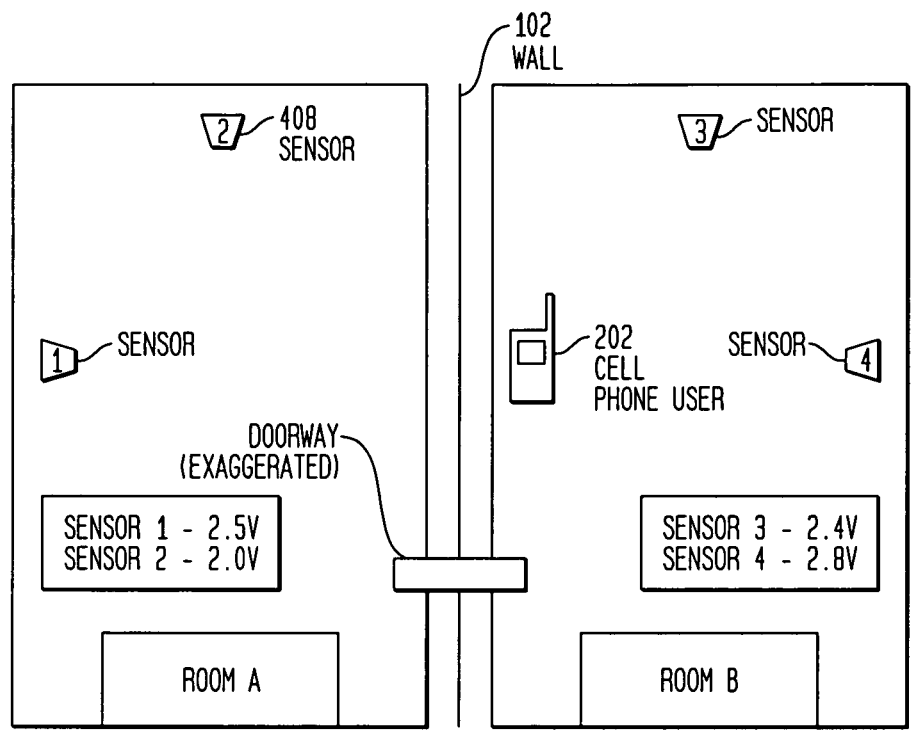
FIG. 8 shows a transmission facility detection system wherein a signal source is differentiated between two adjacent rooms.

In an embodiment, it may also important to know whether a phone is located on one side of an obstruction 102 or the other, such as doors, walls, and the like. If the wrong room is identified, it may make it more difficult to locate a phone and its user. As shown in FIG. 8, detection of the correct room may depend upon the level of the signal received. Proper placement of the detector units 408 may insure that the phone may be identified in the correct location.

Figure 9:
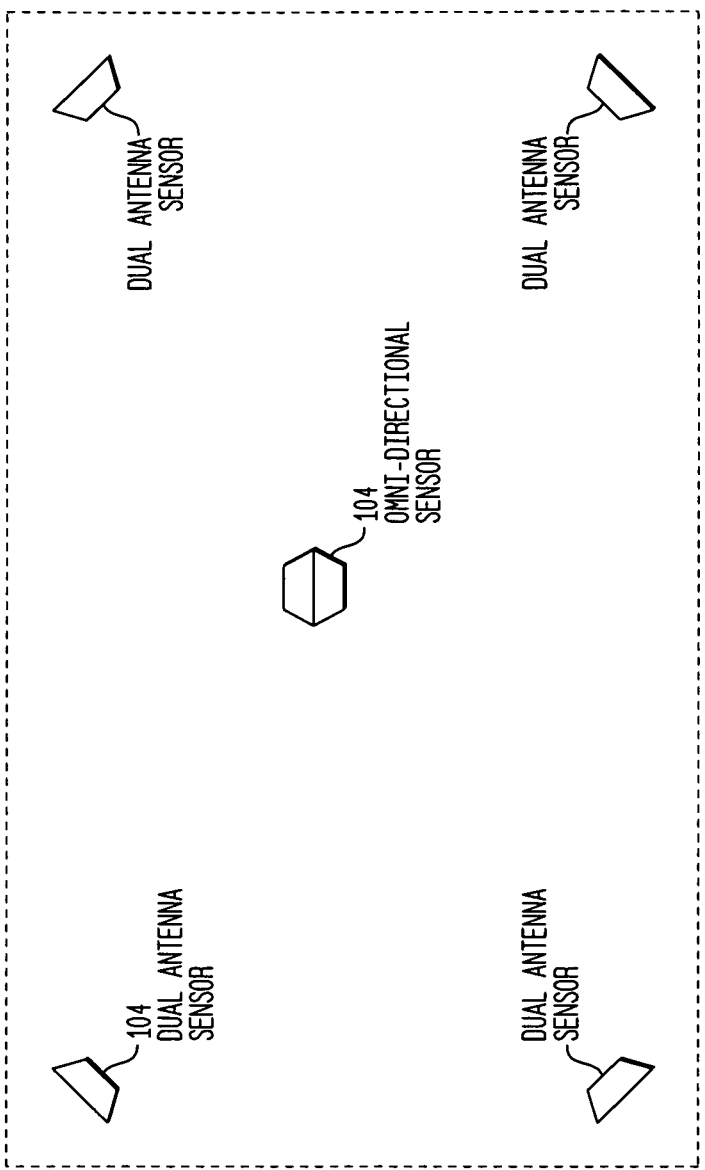
FIG. 9 illustrates a transmission facility detection system wherein multiple antennas are used to identify the location of a signal source after an omni-directional antenna has detected its presence.

In an embodiment of the invention, when sectoring a large room such as a gymnasium, the number and placement of antennas 104 may be critical. In order to sector large regions, such as a ten-by-ten ft section, within the room, the antenna 104 may need to be capable of narrowing their window to an area small enough to meet the requirement. In FIG. 9, there is an omni-directional antenna 104, which detects signal presence. Once a signal crosses a threshold, the direction finding antennas 104 may be turned on to determine the position of the signal. This may be reported to the display 112 and tracked until it is either turned off or moves to another room or hallway. Then, normal positional tracking may take place.

In an embodiment of the invention, the transmission detection, identification, and reporting system 100 may work in conjunction with a personal alarm system. For purposes of describing the invention herein, an alarm system as described in U.S. provisional application Ser. No. 60/739,877, may be considered an exemplary embodiment of an alarm system that may be used in conjunction with the reporting system 100. This dual role system may allow for more cost effective use of the detection units 408 and provide for greater protection for the correctional officer. This detection system may utilize an individualized frequency, with known frequency separation between detection units 408. The detection configuration of the detection units 408 may provide complete coverage of the facility. Each unit may be continually tracked throughout the facility. At all ingress or egress points the focus of the detection may ensure accurate location of all correctional personnel. With the combined systems more detection units 408 may be need to ensure full coverage.

In an embodiment, the transmission detection, identification, and reporting system 100 may allow for cell phone (also referred to as transmission facility) owner discrimination. The system may provide for the allowance of authorized cell phones within the prohibited area. The system may detect and identify each cell phone or transmission facility and compare the cell phone (transmission facility) identity to the allowed transmission facility user list. The system may record all phone use and may automatically alert the facility of all prohibited cell phone or transmission facility use. In addition, each cell phone detection event may be identified with a unique identifier and time code, to ensure proper identification. This may be accomplished by decoding the transmission facility. In an embodiment, the transmission detection, identification, and reporting system 100 the sensor unit determines the Time of Arrival (TOA), phone type, cell phone mode, amplitude, frequency, direction and phase of the transmission, the sensor unit also decodes the information within the transmission and extracts information to determine the cell phone identification.

The receiving system may for example, search a list of allowable characteristics (e.g., IMEI (International Mobile Equipment Identity), IMSI EIN (identification numbers), and/or vendor specified unique identifiers) to determine whether the intercepted information is comparable to one or more characteristics stored in the list of allowable characteristics. The transmission detection, identification, and reporting system 100, may report to the Action facility to jam, block, scramble and/or record the cell phones transmission; thereby controlling the cell phones ability to communicate. Methodologies regarding jamming, DoS, blocking, scrambling and/or recording transmissions are further disclosed in accordance with the principles of the invention.

In one aspect of the invention, the received system may provide the intercepted information to a processor that further includes or is in communication with a storage medium. The storage medium may include a list of allowable characteristics that are allowed within one or more areas of the facility. The processor may search the list of allowable characteristics and when a match is found, allow any transmission that may initiate from, or be directed to the wireless transmission device (e.g., cell phone).

Transmission facility (e.g., cell phone) discrimination may be determined by initiating a cell phone detection regime at each of the points of ingress and egress of a facility, a section of a facility or designated rooms within a facility. For example, returning to FIGS. 1 and 2, a cell phone detection regime may be initiated at locations 120, 122, 124, wherein cell phones (i.e., mobile transmission devices, transmission facilities), whether in an active state or an inactive state may be detected independent of the knowledge of the user or carrier of the cell phone, device and/or transmission facility.

In one aspect of the invention, a low level jammer signal may be emitted by a jamming or frequency transmission unit at each of the designated ingress and egress points of a facility at one or more of the known transmission frequency ranges of cell phones, and/or mobile transmission devices. The jamming signal may be either continuously transmitted or may be periodically transmitted or may be transmitted when a person or user enters a designated region of the ingress or egress points (i.e., on-demand). Intermittent and/or on-demand transmission may be initiated for example through motion sensors that detect motion within a specific area. The motion sensors may be ultrasonic or infrared, for example. In another aspect, an optical trip wire may be extended across the ingress and/or egress points to detect the presence of one or more users within a designated area of the ingress and/or egress point. The optical trip wire may be an infrared or visible incoherent light beam, or may be a coherent light beam (e.g., a laser light).

The low level jammer signal causes, for example in the case of a transmission facility or WI-FI unit, the cell phone within the designated area to lose signal lock with communication and/or controlling unit. For example, when the transmission facility or mobile device is a cell phone or another type of wireless communication device in communication with the base station, access point or cell tower controlling the general area in which the transmission facility (cell phone, WI-FI, and the like) is operating, then the low lever jammer signal causes a loss of communication lock between the base station and the cell phone or wireless communication device. Whether the transmission facility (cell phone, WI-FI) is actively on or in an off mode, re-acquisition of communication lock between the cell phone with the base station (or cell tower) is a low level operational function performed independent of the user or the user's knowledge. The acquisition, re-acquisition or synchronization process between a cell tower (base station) and a cell phone within the area covered by the cell tower are well known in the art and need not be discussed herein.

During the acquisition (synchronization) process, whether the cell phone is actively on or is in an off mode, the cell phone begins a known sequence of transmissions to acquire, and maintain lock, with the cell tower. Within the transmission message is included at least one characteristic of the cell phone (transmission facility) that uniquely identifies the cell phone (transmission facility) to the cell tower (base station, access point). For example, the transmission message may include information such as the cell phone identification number, the telephone number, the manufacture of the cell phone, the version of the operating system, IMEI, PIN (Personal Identification Number), SEN, NIC Id or other transmission facility unique identification, or other known, queered or decodable identifier.

Returning to FIG. 1, within the action facility 114 of the central unit is included at least one of detector unit 408 and a Discriminator Unit (see FIG. 6) which are similar to those at the cell tower intercept the transmission from the mobile transmission device (e.g., cell phone) and identify the device (cell phone, transmission facility, . . . ) based on at least one unique characteristics. The receiving system may for example, search a list of allowable characteristics (e.g, telephone numbers) to determine whether the intercepted information is comparable to one or more characteristics stored in the list of allowable characteristics.

In one aspect of the invention, the received system may provide the intercepted information to a processor that further includes or is in communication with a storage medium. The storage medium may include a list of allowable characteristics that are allowed within one or more areas of the facility. The processor may search the list of allowable characteristics and when a match is found, allow any transmission that may initiate from, or be directed to the wireless transmission device (e.g., cell phone). No additional processing is required. In another aspect of the invention, a time of ingress and/or egress of the detected allowed or authorized device may be recorded to maintain records of those allowed devices (e.g., cell phones) within the facility. The recording may be maintained in the storage medium and/or displayed on a display screen. The display may include the unique characteristic used to identify the cell phone, (i.e., wireless transmission device), WiFi unit, (NIC ID) and/or one or more additional data. For example, a name of the owner of the detected device (i.e., cell phone) may be included in the list of allowable characteristics and the name may be stored and/or displayed.

However, when a match of the detected unique characteristic is not found among the characteristics contained in the list of allowable characteristics, and then the processor may provide instruction to the transmission unit to prevent any further communication between the detected device and the cell tower. The jamming transmitter may be instructed to generate a continuous low level jamming signal or may be instructed to generate a periodic jamming signal or may be instructed to generate an intermittent jamming signal or may be instructed to generate jamming signals at timing intervals known (predetermined) to correspond to the acquisition (synchronization) protocol of the wireless transmission device. The acquisition protocol may be based on the type of cell phone, cell tower and the communication protocol (i.e., GSM, TDMA, CDMA). In another aspect, the acquisition process may be monitored during the attempted acquisition (synchronization) process to determine the frequency and timing intervals of the acquisition signals and, thus, provide jamming signals based on the determined frequency and timing intervals of the acquisition signals.

In addition, the detection of an unauthorized or unallowed device may further generate a warning message to a display system, for example, and/or be recorded on a storage medium. Additional signals may also be provided to one or more auxiliary systems that may be used to inhibit the detected unauthorized device from leaving the designated detection area. For example, a lock on a door to/from an ingress or egress area may be maintained in a lock condition to prevent a carrier of the unauthorized device from leaving the area. Further, the base station and/or controlling unit may simulate the connection to an outside (base station) hold the device from receiving or transmitting a call and displaying, line busy, out of range . . . providing the opportunity to pick up the transmission device. The controlling unit may allow the call for investigative purposes. The system has the ability to record the call, triangulate to the caller or called party, identify said called or calling party and determine location of said party. Once recovered the information inside the transmission facility may be downloaded for investigative purposes.

In another aspect of the invention, a plurality of allowable characteristic lists may be employed wherein selected ones of the plurality of allowable characteristics list may be designated for desired locations. For example, different levels of classification may be implemented wherein selected cell phones or transmission facility may be included on a first list of allowable characteristics, which allow entry to a facility. However, the selected cell phones or transmission device may not be included in a second list of allowable characteristics associated with one or more areas within the facility. Hence, the selected cell phones or transmission facility are not authorized to be within the one or more areas.

Figure 10:
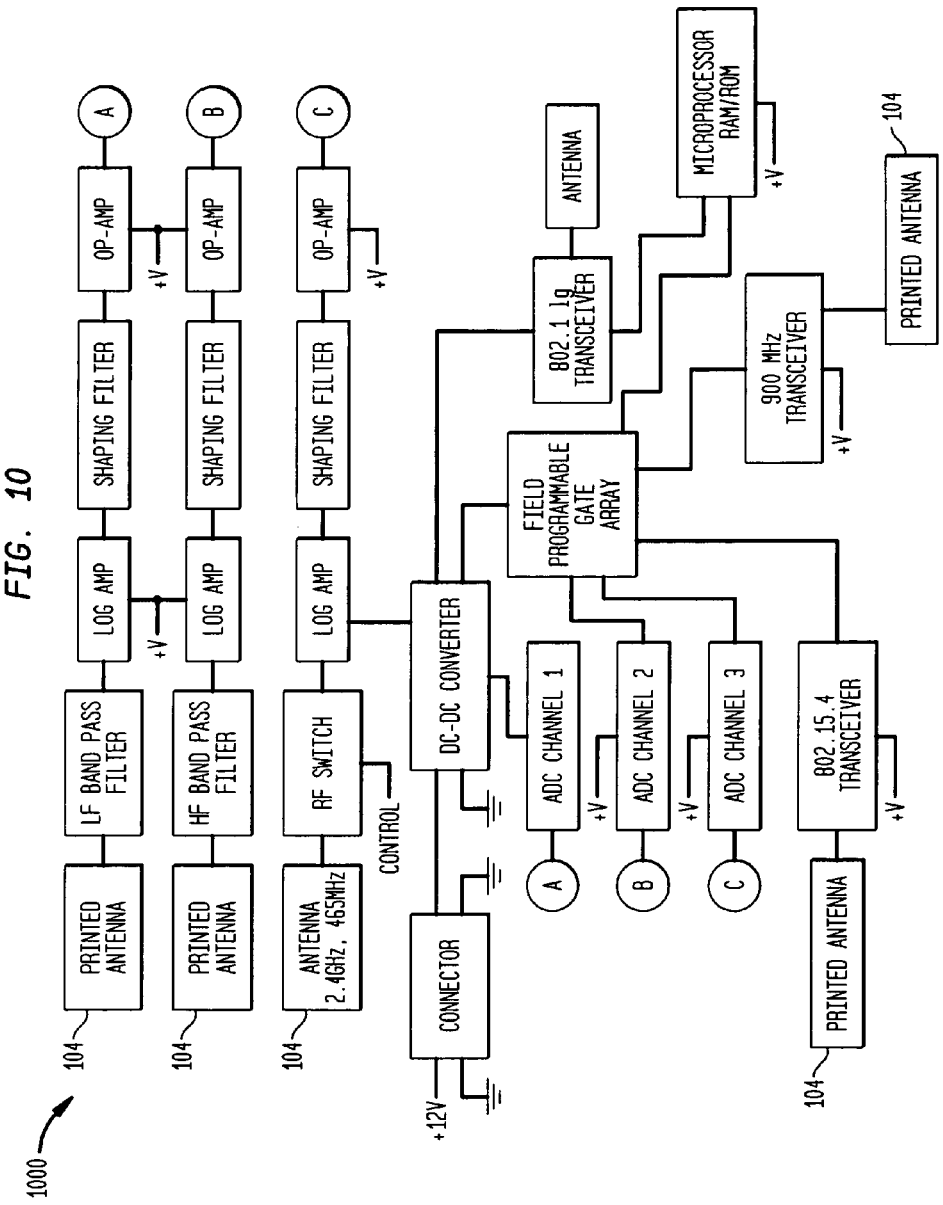
FIG. 10 shows a schematic diagram of a system for detecting signals of a transmission facility.

The cell scan-1 detection system 1000, shown in FIG. 10, is an embodiment of a system for detecting signals of a transmission facility. Antenna 104 receives transmission signals from wireless transmission device (not shown). Antenna 104 may operate, for example in the range of 2.4 GHz with a bandwidth of 465 MHz. The received signals are then provided to a microprocessor, which may determine whether the transmission facility for example, is a person with a transmission facility (wristband) may allow or prevent them from accessing an area. The microprocessor may also alert the central unit of the persons entering or desire to enter a restricted area. In an another embodiment, if the transmission facility for example were a cell phone and the cell phone was in use within a restricted area, the cell phone would be identified by the central unit as being in a restricted area, then the system will determine whether the cell phone authorized or not authorized, then the system would make a determination, based upon set rules whether to allow or disallow the transmission unit.

The cell scan-1 detection system 1000, shown in FIG. 10, is an embodiment of a system for detecting signals of a transmission facility. An antenna 104 receives transmission signals from wireless transmission facilities (not shown). Antenna 104 may operate, for example, in the range of 2.4 GHz with a bandwith of 465 MHz. The received signals may be provided to a low band RF filter to isolate low band RF signals (cell phone), and high band RF filter to isolate high band RF signals (cell phone). The isolated RF signals are provided to Log Amplifiers that amplify or boost the signals using known amplification methods. The switch, switches between two WIFI frequencies all three wireless signal inputs go into a log amp circuit and then to a smoothing filter to clean up the signal to be analyzed then to an Operational Amplifier (Op Amp) which magnifies to a analog signal the signal is the processed through a A/D converter which changes the signal into a digital signal then processed; this is a simple wireless detection unit; the signal is then process in the FPGA and the results are then transmitted via the 2.4 GHz transceiver unit; the 2.4 GHz transceiver has several other applications, and is used to transmit and receive communication information and to connect to external WI-FI communication devices, an example of this is an education system for inmates, medical monitoring equipment in a hospital application, an interactive ID for safe school applications; the 900 MHz transceiver unit is for syncing the sensors, The 465 MHz transceiver unit is for communication with inmates bracelets and Staff (personal alarm system), (lower frequency for better wall penetration, alternative wireless communication device with better wall penetration. In another embodiment, the front end of the signal detection circuit an amplifier (0-40 db gain works well, depending on noise floor isolation a greater gain may be used) is added before the RF filter (example a 824-849 MHz RF filter) to provide for greater sensitivity and a mixer and VCO is added after the RF filter, the output of the mixer is an IF frequency which is amplified then put through a band pass filter, in this case a 200 MHz filter with a bandwidth of 4 MHZ. The signal is then amplified and then put into the log amp then to an op amp and on to an A/D detector. Depending on the noise floor (which is determined by proper grounding), one with an understanding of RF circuitry would know to have proper impedance matching between components, and will utilize transformer where appropriate. The IF section general parameter are 70 MHz to 350 MHz and sensitivity is related to frequency and the width of the band pass filter. The tighter the width of the band pass the greater the sensitivity. In another embodiment, the VCO/mixer may be fixed and the IF band pass filter may be the bandwidth if the desired frequency providing for faster detection without the need to scan.

In this embodiment shown in FIG. 10, the processing section is on a separate board, this provides for multiple sensors front ends utilizing one back end processing unit. This provide for more cost effective sensors and versatility of assets.

Figure 11:
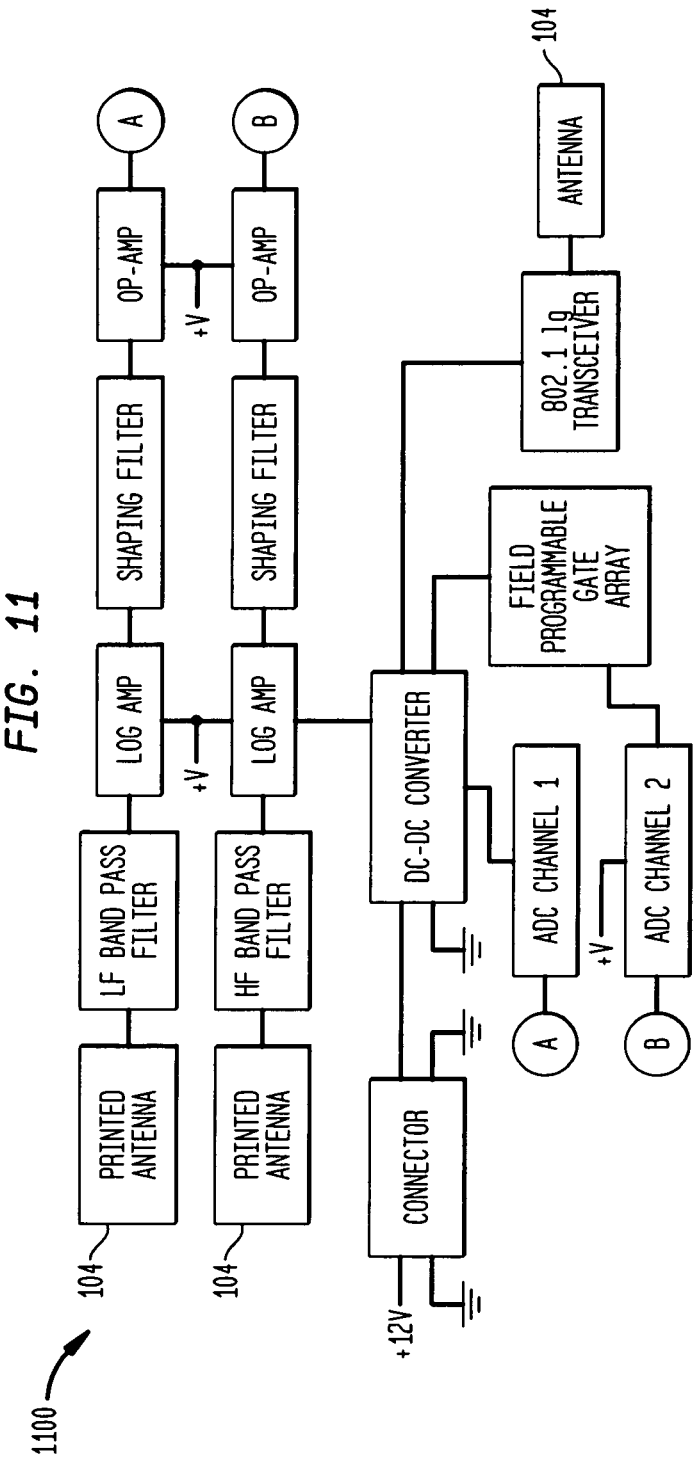
FIG. 11 shows a schematic diagram of an alternate embodiment of a system for detecting a signal of a transmission facility.

The cell scan-2 detection system 1100, shown in FIG. 11, shows an alternate embodiment of a system for detecting a signal of a transmission facility. For this embodiment the RF filters (band pass filter) isolate sets of frequency for greater sensitivity, in this example a low band cell phone signals and high band cell phone signals. The operation of the elements in FIG. 11 is similar to that of FIG. 10 and need not be discussed in detail herein.

Figure 12:
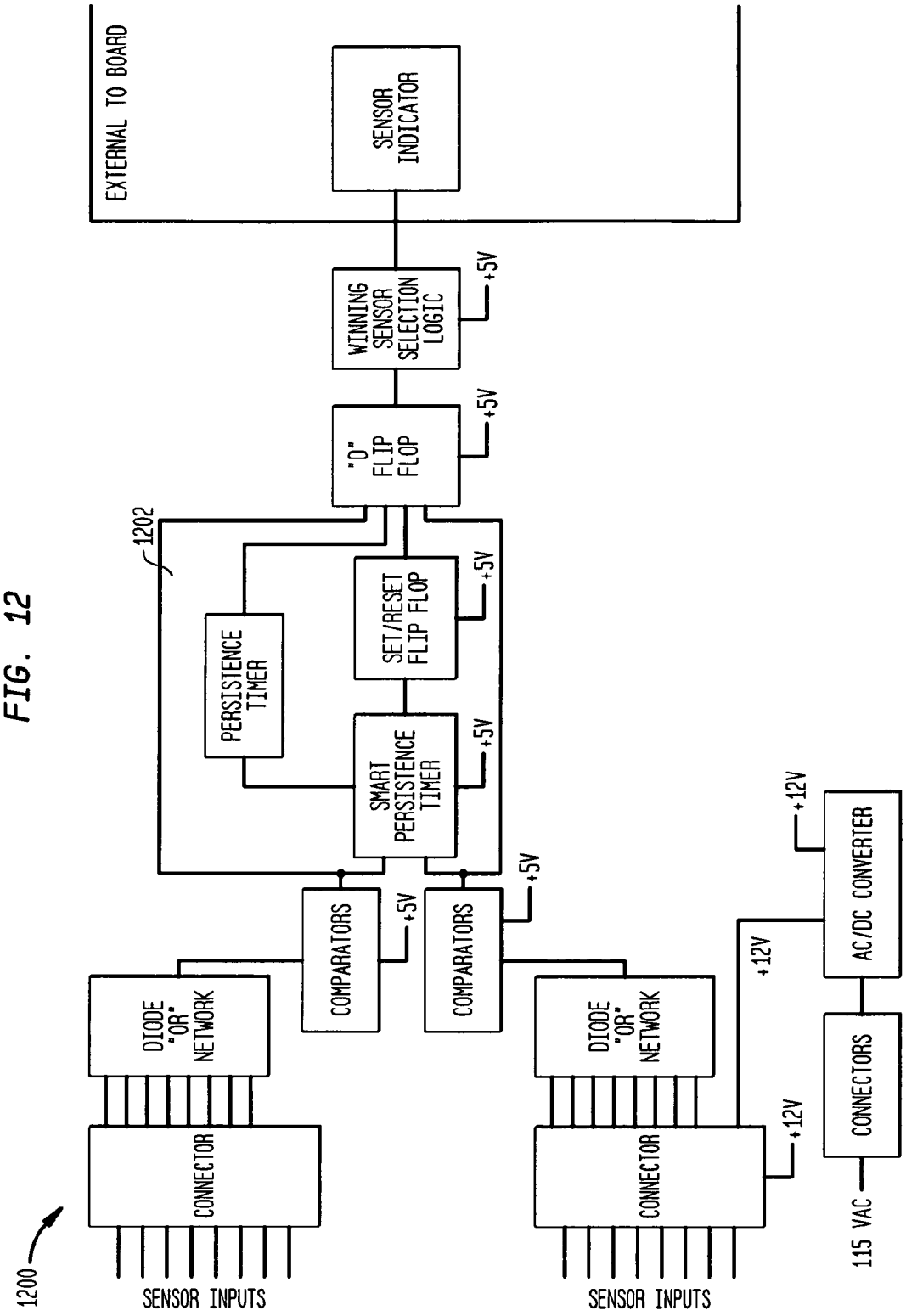
FIG. 12 shows a schematic diagram of a main circuit board within a system for detecting transmission facilities.

The main board system 1200, shown in FIG. 12, is an embodiment of a main circuit board within a system for detecting transmission facilities. The system may be used to determine each signal received is an actual cell phone signal and not a spurious output, a test may need to be performed that checks for the 'persistence' of the received signal. A persistence test may run a timer 1202 for a minimum required time that may be nearly as long as the time of the shortest signal type expected. If the signal is present at the end of the timeout period, it is less likely to be a spurious response and more likely that it is a cell phone output. For example, if a GSM signal of 500 microseconds long is the shortest duration signal of all the cell phone protocols received, the persistence test may run for 450 microseconds to further ensure that the received signal is not merely a spurious response.

Figure 13:
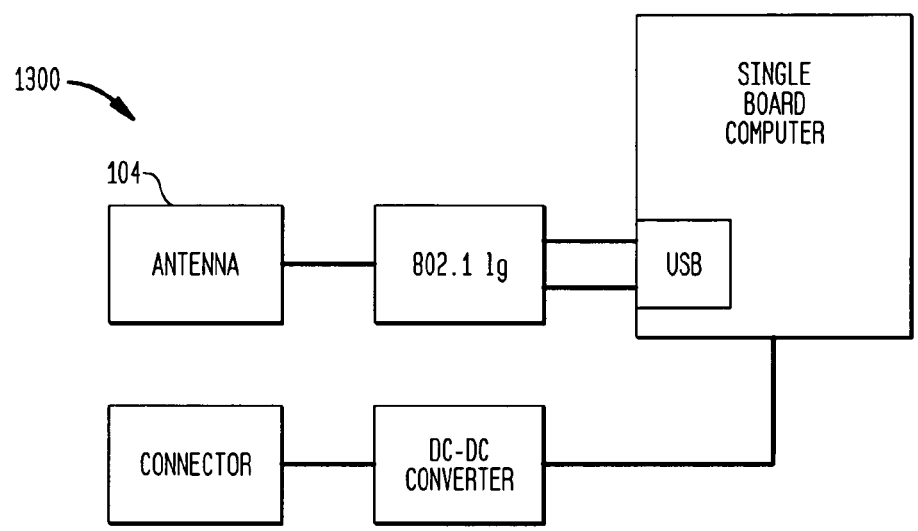
FIG. 13 shows a schematic diagram of a sub-station in a system for detecting transmission facilities.

The sub-station system 1300, shown in FIG. 13, is an embodiment of a sub-station in a system for detecting transmission facilities.

Figure 14:
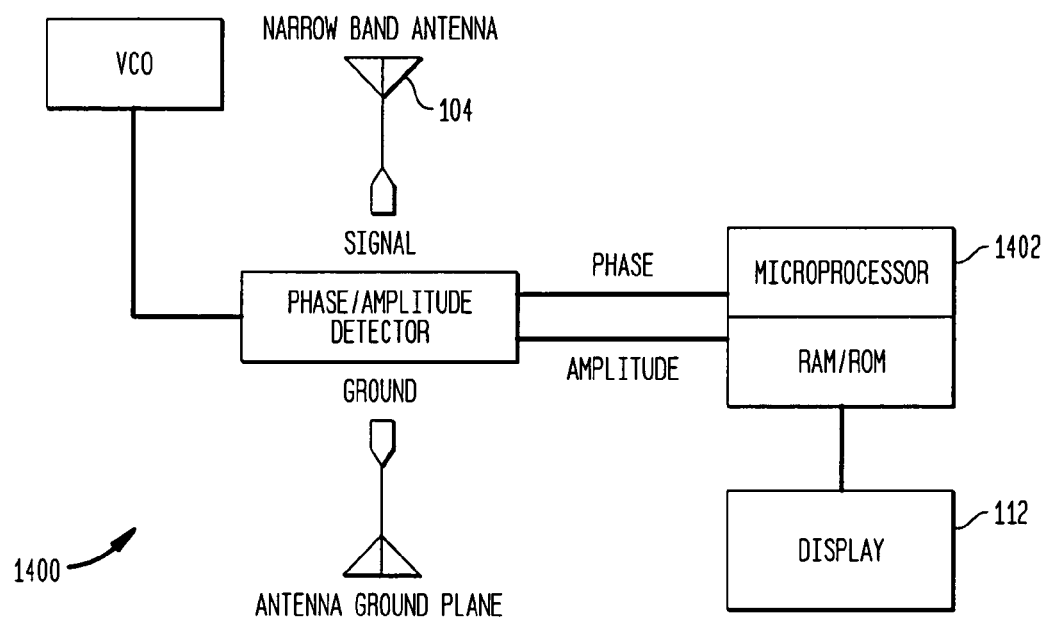
FIG. 14 illustrates a null detection facility.

FIG. 14 illustrates an embodiment of a null detector (1400), wherein the VCO in FIG. 14 tunes to known antenna frequencies and the system detects a null in the known antenna frequencies in which the antenna is detected. In embodiments, the null detection system may detect the presence of a transmission facility even when the transmission facility is not transmitting a signal. In embodiments, a hand held or mounted null detection device may be used in a correctional institution or other government facility. In embodiments, null detection may utilize a transmission-detection source, independent of the transmission source being detected, which is capable of sweeping across the frequency spectrum of interest and receiving it's returning signal. The transmission source sweeps the spectrum of interest, searching for distortions in the returned field. Distortions in the spectrum may be due to the presence of an antenna of a transmission facility 202. As one skilled in the art would recognize the application and can modify system for greater application and distances.

Figure 15:
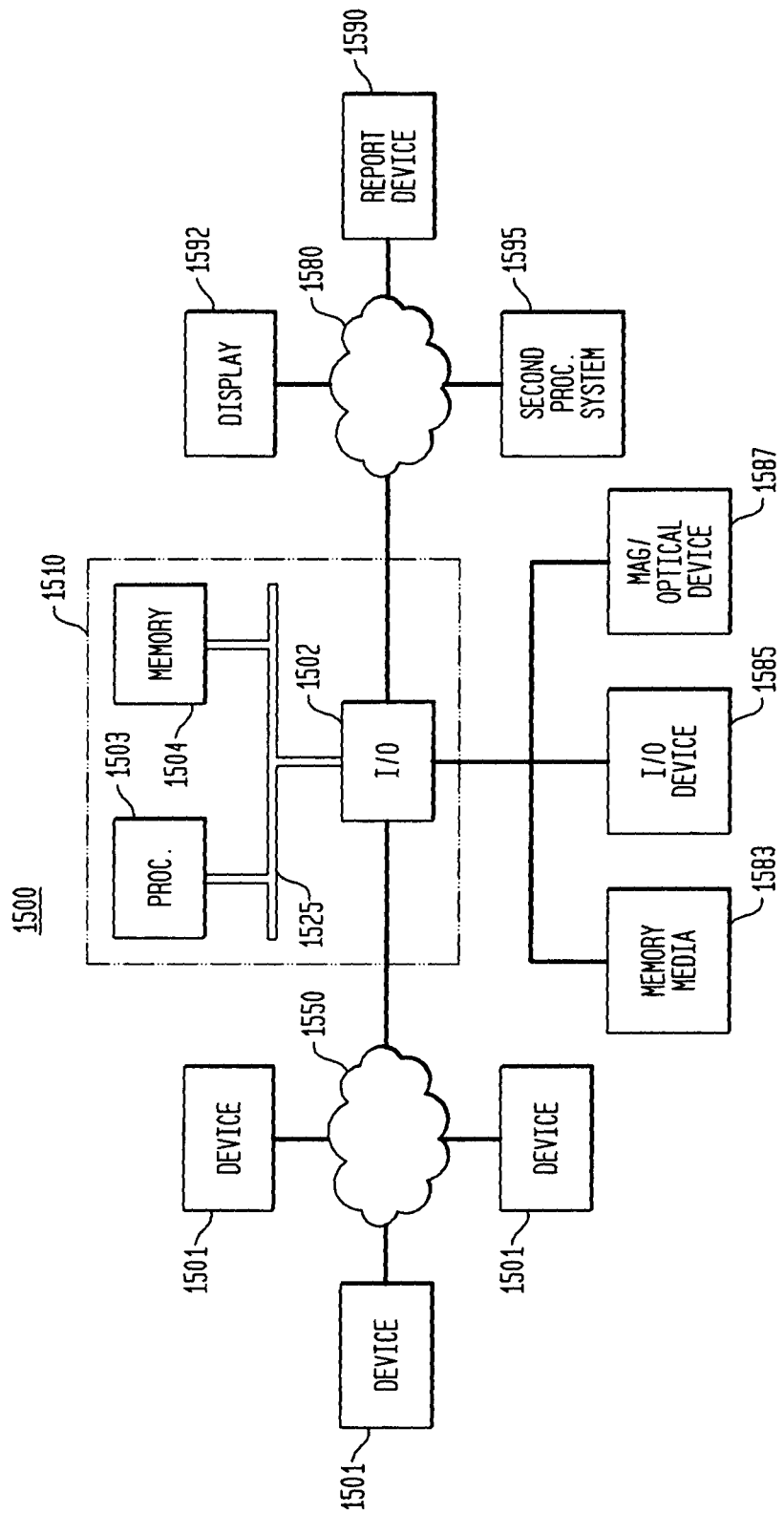
FIG. 15 illustrates a system for implementing the processing shown herein.

FIG. 15 illustrates a system 1500 for implementing the principles of the invention shown herein. In this exemplary system embodiment 1500, input data is received from sources 1501 over network 1550 and is processed in accordance with one or more programs, either software or firmware, executed by processing system 1510. The results of processing system 1510 may then be transmitted over network 1580 for viewing on display 1592, reporting device 1590 and/or a second processing system 1595.

Processing system 1510 includes one or more input/output devices 1502 that receive data from the illustrated sources or devices 1501 over network 1550. The received data is then applied to processor 1503, which is in communication with input/output device 1502 and memory 1504. Input/output devices 1502, processor 1503 and memory 1504 may communicate over a communication medium 1525. Communication medium 1525 may represent a communication network, e.g., ISA, PCI, PCMCIA bus, one or more internal connections of a circuit, circuit card or other device, as well as portions and combinations of these and other communication media.

Processing system 1510 and/or processor 1503 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 1503 may be a central processing unit (CPU) or dedicated hardware/software, such as a PAL, ASIC, FGPA, operable to execute computer instruction code or a combination of code and logical operations. In one embodiment, processor 1504 may include code which, when executed by the processor, performs the operations illustrated herein. The code may be contained in memory 1530, may be read or downloaded from a memory medium such as a CD-ROM or floppy disk, represented as 1583, may be provided by a manual input device 1585, such as a keyboard or a keypad entry, or may be read from a magnetic or optical medium (not shown) or via a second I/O device 1587 when needed. Information items provided by devices 1583, 1585, 1587 may be accessible to processor 1503 through input/output device 1502, as shown. Further, the data received by input/output device 1540 may be immediately accessible by processor 1503 or may be stored in memory 1504. Processor 1503 may further provide the results of the processing to display 1592, recording device 1590 or a second processing unit 1595.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 1510 may also be in two-way communication with each of the sources 1501. Processing system 1510 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 1550 and 1580 may also be internal networks or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, while the device described herein is referred to as a transmitting device, it would be recognized by those skilled in the art that the device may incorporate a receiving unit, designed to operate in one or more frequency bands over a wide frequency range. For example, the receiving system may represent a crystal receiving system that may detect one or more signals within a frequency range, or may represent a superhetrodyne receiver that may detect and determine the frequency of operation of received signals.

In an embodiment of the transmission detection, controlling, identification, and reporting system 100 may allow for interface with existing communication devices, to, in which the allow or deny control executed by the wireless provider. According, the embodiments shown may also include an interface to the controlling unit.

In an embodiment of the transmission detection, controlling, identification, and reporting system 100 may allow for the detector units 408 to include an antennas 104, and a controlling unit to which matching the transmission facilities 202 with its unique identifier is critical for proper identification and control in this configuration, the detector units 408 may individually control or may direct control over the transmission facilities 202.

In an embodiment of the transmission detection, controlling, identification, and reporting system 100 may allow for the detector units 408 to include antennas 104 and the controlling unit to be externally integrated with the transmission detection, controlling, identification, and reporting system 100, where matching the transmission facility 202 with its unique identifier is critical for proper identification, matching the transmission facility 202 unique identifier with the proper transmission facility 202 may be accomplished thru the time of arrival, phone type, transmission frequency, time division separation, time sync, channel frequency, cell tower identifier, (Cell Phone) Transmission facility identifier or a combination of one or more methodologies depending on complexity and transmission facility 202 environment and the like.

In an embodiment application such as a military facility, corrections complex or a defined area where transmission facilities 202 are prohibited, the transmission detection, controlling, identification, and reporting system 100 whether internal or external the facility may control, identify and prohibit transmission facility 202 use depending on location or approximate location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (ix) location based on proximity to known locations (including locations of other radio-transmitters), (x) map-based location, or any combination of any of the foregoing, as well as other location facilities known to those of skill in the art.

In an embodiment, the action facility 114 for controlling the transmission facility 202 units may utilize repeaters, array antennas, software radio and/or 3rd party base station technology, (nano, pico, base station technology-, and or intercept technology, these may be active or passive.

In an embodiment, the action facility 114 identifying the transmission facility 202 may utilize repeaters, array antennas, decoders, integrated chip modules, and may also utilize software radio and/or integrated and/or 3rd party base station technology, (nano, pico, base station technology-, and or sniffer technology.

In an embodiment of the transmission detection, controlling, identification, and reporting system 100 whether to control the transmission facility 202, may be determined by location of the transmission facility 202, type of transmission facility 202, identification of transmission facility 202, time of transmission of the transmission facility 202 frequency of the transmission facility 202, based on type of base station technology and/or location of base station technology and the like.

In an embodiment of the transmission detection, controlling, identification, and reporting system 100 where system is in sync with the Base station or intercept unit and correlate the signals with the IMEI number, wherein the unique identifier is supplied by the Base station and/or software radio, or the unique identifier is provided by the signal detection sensor. In an embodiment of the transmission detection, controlling, identification, and reporting system 100, the system transmits the type, time, frequency of the wireless transmission facility of interest, the Base station or intercept unit provides to the system the ESMI/IMEI) or Base station or intercept unit detect a transmission facility at a specific frequency and the transmission detection, controlling, identification, and reporting system 100 tunes to that frequency and determine the location and unique identifying information and compares that unique identifying information to a data base, the information and the parameters decide how to treat the transmission facility, what to do with the transmission facility depending if the transmission facility is considered friend or foe (i.e., allowed or disallowed).

In an embodiment of the transmission detection, controlling, identification, and reporting system 100 where the transmission detection units includes a transmission decoding unit the system determines the location and the allowability of the transmission unit by comparing the transmission found with allowable or non-allowable transmission facility lists.

In an embodiment of the transmission detection, controlling, identification, and reporting system 100 the system may allow the friend transmission facility to talk and receive call, by directing the remote cell tower, and/or third party base station and or software radio to allow the transmission facility to receive or transmit information, voice, data and the like.

In another embodiment of the transmission detection, controlling, identification, and reporting system 100 the system may allow transmission facility to talk and receive call, by directing the integrated cell tower (action facility) and/or software radio to back haul the call to a Telco (telecommunication company) and the like.

In an embodiment of the transmission detection, controlling, identification, and reporting system 100 where system are integrated and in sync with the Base station, the systems correlate the signals with the IMEI number (the Base station provides the transmission facility's identification information. There are several ways to accomplish the detection and correlation of transmission facility. One way to accomplish this is the system communicates the type, time and frequency of the transmission facility and the base station and/or software radio, transmission facility sniffer, provides back the transmission facility identification number related to the information provided by the system, (in this case the cell phone IMEI and/or Cell phone identification number)).

In an embodiment of the transmission detection, controlling, identification, and reporting system 100 the base station and/or software radio, transmission facility sniffer, indicates there is a transmission facility within the area covered by the transmission detection, controlling, identification, and reporting system 100, the base station and/or software radio, transmission facility sniffer, provides at least on unique identifier to the transmission detection, controlling, identification, and reporting system 100 (such as frequency, type of transmission facility, TOA, and the like) and the transmission detection, controlling, identification, and reporting system 100 determines the location of the transmission facility, depending on the parameter of allowability, directs the action facility (the base station and/or software radio, transmission facility sniffer, recording, Jam, CCTV) to performs a set of actions. Some of the options are, jam the signal specific to the cell phone, Denial of Service (DoS) the cell phone, allow the call and record the conversation, allow the call and indicate it is a known (friendly) phone . . . these parameters change depending on location, and other variables depending on application parameter and the like.

In an embodiment an allowability unit is used to determine the allowability of a transmission facility the allowability unit may use location information, action facility determined information, unique identifier information, location, type, hour, ownership, area and transmission facility and the like. It may also use location of a transmission facility in relationship to another transmission facility, such as a tracked unauthorized person using a cell phone.

In an embodiment of the transmission detection, controlling, identification, and reporting system 100 where the detection system is separate from the discriminator unit, in this case the discriminator unit may also include a controlling unit employing base station technology and the like, wherein a unique set of characteristics are received by the detecting unit, and/or system 100, which then provides information to the discriminator unit and/or controlling unit, which then passes back the correlated transmission facilities IMEI number. The controlling unit, software radio, and the like may provide the ESMI/IMEI information of; for example, a cell phone on the side of the road, with a person talking on it may not need to be disabled. This is in contrast to a cell phone in a standby mode located within a zone of danger (e.g., 60 meters of the road) that may need to be controlled and disabled.

In another embodiment, this may be accomplished by the controlling unit directing the detecting unit, utilizing known parameters, to determine a location for example, identified by a unique characteristics (I.G. type, freq, time) to triangulate a known transmission facility within a zone of interest, and then process the information via a set of parameters. In another embodiment and/or application the detecting unit may locate a transmission facility and send the external discriminator unit the type, freq, time of the located transmission facility and the discriminating unit to provide the unique characteristics to make a determination based on the status of the detected transmission facility. In an embodiment in which the discriminator is co-located with in the detecting unit the location and unique characteristics are know and the location may then the information is processed via a set of rules, depending upon whether the transmission unit is identified as a friend or foe (allowed/disallowed).

In another embodiment, the system (100) will be to allow an authorized transmission facility to continue and/or provide the ability for the wireless transmission, (i.e., to talk and/or to receive calls) depending on the configuration and application. In an embodiment of the transmission detection, controlling, identification, and reporting system 100, where the detection system is separate from the discriminator unit. In this case the discriminator unit may also be the controlling unit (base station technology and the like,) the system 100 instructs the controlling unit to allow or disallow detected transmission facilities, as determined by their location.

In an embodiment of the transmission detection, controlling, identification, and reporting system 100 compares the obtained information and depending, if the transmission facility is a authorized and/or unauthorized (friend or foe), the system directs the controlling unit to release the transmission facility. The system may in an embodiment version, release the authorized transmission facility, to an active controlling unit or back haul the authorized transmission facility, then display the transmission facility device as authorized transmission facility (transmission facility displayed in green), with it known Identification characteristics, and continue to control an unauthorized (foe) Transmission facility not allowing the transmission facility and/or preventing the transmission facility from making or receiving communications and displaying the unauthorized transmission facility in red. The system may take the incoming transmission facility and triangulate its position, this process is accomplished by, knowing ID of the transmission facility and using the information obtained by the controlling facility (frequency, time, type, channel . . . ) and searching for the incoming call signal. In an IED situation, finding the trigger man. The Array antennas will utilize large front end gain for the greatest distance and the trigger man in most cases will have line of sight of the target. As discussed previously, jamming the area, to gain control of the transmission facility is one method of capturing the transmission facility.

In an embodiment of the transmission detection, controlling, identification, and reporting system 100 where transmission facility retrieved data may be used to locate threats to personnel, and or prevent an escape. Recovered transmission facility data may be used to track co-conspirators location and/or identify of an unauthorized transmission facility.

In an embodiment of the transmission detection, controlling, identification, and reporting system 100 where if it is determined the transmission facility is not allowed, and it is determined to control the transmission facility, by recording its audio and digital transmission, the system has an ability to manipulate said transmission facility, by raising signal strength, ringing phone, enabling and/or disabling features and the like. In another embodiment of the transmission detection, controlling, identification, and reporting system 100, if it is determined the transmission facility is not allowed, the system 100 includes jamming technology to disable said transmission facility. There are many techniques, depending on the desired results, take one cell phone or many cell phone off line, depending on application needs, such as Repeat jammer, pinpoint, broad band, channel and the like It is expressly intended that all combinations of those elements that perform substantially the same function in substantially the same way to achieve the same results are within the scope of the invention. Substitutions of elements from one described embodiment to another are also fully intended and contemplated. For example, while the term "cell phone" has been used herein, such term relates to a general class of wireless transmission devices that includes standard cell phones, smart phones (e.g., PALM CENTRO), and iPhones. PALM is a registered trademark and CENTRO is a trademark of the Palm Inc., Sunnyvale, Calif. iPhone is a registered trademark of Apple Inc. Culpertino, Calif.

While the invention has been described in connection with certain preferred embodiments; other embodiments would be understood by one of ordinary skill in the art and are encompassed herein.

What is claimed is:

1. A system for discriminating transmission facility usage in an area, said system comprising:
    at least one detector unit detecting a transmission of said transmission facility;
    an identification unit in communication with said at least one detector unit:
        receiving the detected transmission; and
        identifying said transmission facility based on a unique characteristic-associated with said received detected transmission; and
    a management unit managing the transmission of said identified transmission facility, said management unit comprising:
        an allowance unit:
            determining whether further transmission of said transmission facility is allowed based on said unique characteristic;
            initiating a transmission facility re-acquisition process, said re-acquisition process allowing said further transmission from said transmission facility to communicate with an external cell tower when further transmission is indicted; and
            continuing to receive said further transmission from said transmission facility when further transmission is not indicated, wherein said transmission facility is inhibited from communicating with said external cell tower.

2. The system of claim 1, wherein said further transmission is determined based upon a list of allowable unique characteristics.

3. The system of claim 1, wherein said allowance unit comprises:
    a processor in communication with a memory, the memory including code which when accessed by the processor causes the processor to:
    compare said unique identification characteristic with each corresponding characteristic in a list of allowable characteristics.

4. The system of claim 3, wherein said indication of further transmission is generated when said unique identification characteristic matches at least one corresponding characteristic in said list of allowable characteristics.

5. The system of claim 1 further comprising:
    providing at least one signal to at least one auxiliary system.

6. The system of claim 1, wherein said unique characteristic is determined from at least one of: a vendor determined unique identifier, a transmission frequency, a transmission frequency range, a transmission type, an identification number, and an IMEI number.

7. The system of claim 1, wherein said at least one detector unit is located at at least one: of an ingress and an egress point to said area.

8. The system of claim 1, further comprising:
    a reporting unit reporting said detected transmission facility.

9. The system of claim 1, further comprising:
    a low-level jamming unit transmitting a signal in at least one known frequency range.

10. The system of claim 9, wherein said jamming unit transmits said signal at a rate selected from a group consisting of: continuous, periodic, intermittent, and on-demand.

11. The system of claim 1, wherein said identification unit comprises:
    a processor in communication with a memory, the memory including code which when accessed by the processor causes the processor to:
    receive information from said at least one detector unit; and
    extract the unique identification characteristic from said information.

12. The system of claim 1, wherein said identification unit comprises:
    a base station unit:
        receiving information from said detector unit or providing information to said detector unit;
        extracting a unique identification characteristic from said information;
        comparing said extracted unique identification characteristic with a-list of allowable unique identification characteristics; and
        indicating positive identification when said extracted identification characteristic is determined to be contained on said list of allowable unique identification characteristics.

13. The system of claim 12, wherein said identification unit controls said transmission unit.

14. The system of claim 1 further comprising:
manipulation of said transmission facility when allowability is not indicated.

15. The system of claim 1 further comprising:
denial of continued transmission of said transmission facility when allowability is not indicated.

16. The system of claim 1, wherein said identification unit comprises one of:
a software radio and a base station unit:
receiving information from said detector unit.

17. The system of claim 16, wherein said identification unit manipulates said transmission facility when allowability is not indicated.

18. The system of claim 1 further comprising:
data from said transmission facility provides unique identification characteristic for positive identification and location of said transmission facility.

\* \* \* \* \*